United States Patent Office 3,746,614
Patented July 17, 1973

3,746,614
METHOD FOR DETECTING AND LOCATING
FAILED SODIUM-BONDED FUEL ELEMENTS
Robert J. Meyer, Westmont, Carl E. Johnson, Elk Grove, and Carl E. Crouthamel, Glen Ellyn, Ill., assignors to the United States of America as represented by the United States Atomic Energy Commission
No Drawing. Filed Sept. 29, 1972, Ser. No. 293,724
Int. Cl. C27c 17/14
U.S. Cl. 176—19 LD
9 Claims

ABSTRACT OF THE DISCLOSURE

This invention is a method for detecting and locating failed sodium-bonded fuel elements in a liquid-sodium-cooled nuclear reactor. A mixture of any two of the three staple isotopes $^{197}$Au, $^{121}$Sb and $^{198}$Pt is dissolved in the sodium bonding in each of a plurality of unirradiated sodium-bonded fuel elements. The fuel elements within each subassembly or group of fuel elements contain an isotopic mixture of the same predetermined weight ratio of the two selected isotopes. Gamma-spectrometric assay of the primary sodium coolant will detect the isotopes' activation products released into the coolant by a fuel element failure and determine the activity ratio thereof to indicate which subassembly contains the failed fuel element.

CONTRACTUAL ORIGIN OF THE INVENTION

The invention described herein was made in the course of, or under, a contract with the United States Atomic Energy Commission.

BACKGROUND OF THE INVENTION

This invention relates to the detection and location of failed fuel elements and in particular to sodium-bonded fuel elements of a liquid-sodium-cooled nuclear reactor. Specifically, the invention relates to an isotope tagging method for detecting and locating failed sodium-bonded fuel elements wherein the activation products of the stable isotope tags are detected in the primary sodium coolant of a breeder reactor.

Failures in the cladding of nuclear fuel elements in nuclear reactors present very serious problems and can result in extensive and costly damage to the reactor as well as long periods of reactor shutdown. To prevent this serious damage, such failures must be detected and located both easily and quickly. Therefore, the problems of detecting and locating fuel-cladding failures in nuclear reactors have received considerable attention for a number of years.

A variety of devices and methods for detecting and/or locating failed fuel elements have been developed over a period of time, especially for use with liquid-sodium-cooled nuclear reactors. One highly successful method utilizes the detection of gaseous daughter products of dissolved fission products. When a fuel elements cladding ruptures, sodium coolant enters the fuel element and dissolves some of the fission products contained therein. The dissolved fission products, now in the sodium coolant system, decay into their gaseous daughter products, such as $^{135}$I to $^{135}$Xe and $^{135m}$Xe. These daughter products are then detected by various means. An example of such a method can be found in U.S. patent application Ser. No. 194,963(70), which is assigned to the assignee of the present invention.

Another successful method involves an isotopic-tagging system wherein mixtures of gaseous isotopes of elements such as xenon, neon, helium, argon and krypton are injected into the gas bond of the fuel element, the bond being located between the fuel and the cladding, during fabrication of the fuel element. These tagged fuel elements are then placed in the reactor, and should one of these fuel elements fail, some of the gas bond containing the gaseous isotopic tag escapes into the sodium coolant and appears in the cover gas of the reactor. Mass-spectrometric analysis of the cover gas then identifies the ratios of the isotopes and thereby locates the failure. Once the subassembly containing the failed fuel element has been removed from the reactor, the tag is easily removed from the cover gas either by purification or replacement thereof. Specific examples of such tagging methods can be found in U.S. Pat. No. 3,663,363, which is also assigned to the assignee of the present invention, and U.S. Pat. No. 3,632,470, assigned to General Electric Company.

The above-described prior art methods, though, were designed for gas-bonded fuel elements, because the gas-bonded type of fuel contains no materials which would impede the release of the tag or fission products once the cladding has been breached. However, the Experimental Breeder Reactor II (EBR–II), which is an Atomic Energy Commission liquid-sodium-cooled facility for testing various aspects of breeder reactor technology, utilizes driver fuel which is sodium-bonded rather than gas-bonded as well as a variety of experimental fuels which are encapsulated and have a sodium bond between the fuel cladding and the capsule. In addition, sodium-bonded carbide and nitride fuel elements will also be utilized in EBR–II and perhaps other such reactors. The above detection and location methods for use with gas-bonded fuel elements are unsuitable for sodium-bonded fuels, for the bond sodium would impede or prevent the release of the gaseous tag or dissolved fission products from most cladding defects. Also, due to the low solubility of the gaseous tags in liquid sodium, the amount of the gaseous tags which can be injected into the sodium bond of the fuel elements is insufficient to enable effective detection in the reactor cover gas even if the tag was capable of escaping through a cladding break. Therefore, other devices and methods are necessary for use with sodium-bonded fuels.

EBR–II has been utilizing several different devices for detecting the occurrence of fuel element failures. These include a failed element rupture detector which detects delayed neutrons emitted in certain fission-product decay schemes, a fission gas monitor which detects the radioactive alkali-metal daughters of noble-gas fission products, and a reactor cover gas monitor which detects noble-gas fission products in the cover gas. While such devices are successful in detecting a failure, they must be utilized with other diagnostic information as well as with a fuel-shuffling system in order to locate these failures, and this process is time-consuming and consequently expensive because of the prolonged reactor shutdowns which are required. Therefore, a completely new and different method for detecting and locating failed fuel elements is necessary when utilizing sodium-bonded fuels.

The inventors have devised such a new and unique method for use in the detection and location of failed sodium-bonded fuel elements. This novel tagging method enables the simple and rapid detection and location of such failures, thereby preventing serious reactor damage as well as limiting the periods of reactor shutdown. The unique tags utilized in the present invention are readily released upon cladding failure and easily detectable after their release, yet they are not produced in quantity by the reactor, are not detrimental to the reacor and because of their unique nature, do not interfere with the identification of tags from subsequent failures.

Therefore, it is one object of this invention to provide a method for detecting and locating failed fuel elements in a nuclear reactor.

It is another object of the invention to provide a method for detecting and locating fuel element failures in a liquidsodium-cooled nuclear reactor wherein the fuel elements contain a sodium bond.

It is finally an object of the present invention to provide a method for detecting and locating failed sodium-bonded fuel elements in a liquid-sodium-cooled nuclear reactor by dissolving a mixture of two isotopes selected from the group of $^{197}$Au, $^{121}$Sb and $^{198}$Pt in the sodium bonding of the fuel elements and subsequently detecting the isotopes' activation products in the sodium coolant.

SUMMARY OF THE INVENTION

This invention comprises dissolving a mixture of any two of the three stable isotopes $^{197}$Au, $^{121}$Sb and $^{198}$Pt in the sodium bonding of each of a plurality of unirradiated sodium-bonded fuel elements. Each subassembly of fuel elements utilizes a different weight ratio of the two selected isotopes, with the fuel elements within each subassembly containing identical ratios. These fuel elements are then placed in a liquid-sodium-cooled nuclear reactor, and upon operation of the reactor, these isotope tags are activated, the activation products being $^{197}$Au→$^{198}$Au, $^{121}$Sb→$^{122}$Sb and $^{198}$Pt→$^{199}$Au. Due to the varying of the weight ratios of the original stable isotope mixtures, each activated tag mixture has a distinctive activity ratio which is identifiable through gamma-spectrometric assay. Therefore. when a fuel cladding defect occurs, these activation products are discharged into the primary sodium coolant. Upon sampling the sodium coolant and performing appropriate separation procedures, the presence of any such activation products can be detected and the particular activity ratio determined by gamma-ray spectrometry. The tag activity ratio, then, identifies the particular subassembly containing the faulty fuel element.

DETAILED DESCRIPTION OF THE INVENTION

When devising the present invention and determining what particular isotopes, if any, could be utilized as tags therein, a number of important criteria had to be considered. First, the tag had to be released upon fuel element cladding failure. This meant that the tag, located in the sodium bond, must be homogeneously dissolved in the bond sodium, since discharge of all the sodium from a cladding defect is highly improbable. Also, the tag had to be detectable in the primary coolant after its release from a failed fuel element. This imposes drastic solubility limitations on any potential sodium-soluble tags. For example, 1 p.p.b. of isotopic tag is considered readily detectable, and with approximately 76,000 gal. (3×10$^8$ grams) of sodium in EBR–II's primary coolant system, at least 100 mg. of tag should be utilized in each fuel element. Each of the driver fuel elements of EBR–II only contains about 0.8 gram of bond sodium. Therefore, the tag has to be highly sodium-soluble. In addition, the tag cannot be removed from the sodium coolant by any mechanism such as adsorption on steel surfaces, nor can impurities already present in the sodium coolant interfere with the detection of the tags.

Another criterion is that each tag be unique and remain unique after its release. A sufficient number of tags, then, had to be devised so that each subassembly can be tagged with a distinguishable tag. EBR–II, for example, would require 75 to 100 separate tags. In order to obtain this many tags which meet the criterion discussed herein, then, it was determined that mixtures of isotopes in varying ratios must be utilized.

One very important criterion is that a tag, once released, cannot interfere with the identification of tags released from subsequent fuel element failures. The identification of a tag released from the first cladding failure would present no problem. However, subsequent releases become progressively more difficult to identify if previous tags are still detectable. For example, if the sodium coolant contains a previously release tag with an isotopic ratio of 25/75, a new isotopic ratio of 50/50 can be produced by the release of any tag having an isotopic ratio of greater than 50/50. For gaseous tags used with the gas-bonded fuel elements, this problem is easily solved by merely purifying or replacing the cover gas. However, with the present invention, tags, upon release, are dissolved in the sodium coolant and are detected in samples thereof. Replacement of the coolant, obviously, is impractical, and cold trapping to purify the sodium would not remove previously released tags effectively enough to eliminate interference. Therefore, the present invention utilizes tags which have activation products with suitably short half-lives, enabling thereby the removal of the tags through decay.

The final criteria are that the tags cannot be produced in quantity within the reactor, and that the tags must not be detrimental to the reactor. If the tag isotopes were produced in any quantity within the reactor, this would interfere with the correct determination of the isotope ratios for released tags. In addition, it must be assured that neither the concentrated tag in the fuel element nor the released, diluted tag can create corrosion, pressure, thermal-conductivity or nuclear problems within the reactor.

A wide variety of elements were considered for possible use as tags in the present invention. However, after considering all of the above criteria such as sodium solubility, detriment to reactor, and the half-life of activation products. the stable isotopes $^{197}$Au, $^{121}$Sb, and $^{198}$Pt were selected as suitable for the present purpose. The activation products, and half-lives, of these isotopes are, respectively, $^{198}$Au (2.7 days), $^{122}$Sb (2.8 days) and $^{199}$Au (3.15 days). While any two of the three isotopes may be utilized together as the isotopic tagging mixture, $^{197}$Au/$^{121}$Sb and $^{197}$Au/$^{198}$Pt are preferred for reasons given below.

The stable isotopes are utilized for initial injection into the sodium bond of the unirradiated fuel elements for two reasons. First, it makes the process of fuel element fabrication simpler and easier, for no special precautions or techniques are required for injecting the stable tag. Second, the unirradiated fuel elements may be stored for a considerable time before use, and therefore the tagging mixtures must initially be stable prior to fuel element use and irradiation.

The amount of tagging mixture added to each fuel element, which is hermetically sealed after the addition, is dependent entirely on the amount of bond sodium in the fuel element and the amount of sodium in the coolant system of the particular reactor in which the fuel element will be utilized. There must be sufficient tag in the fuel element to enable detection thereof in the sodium coolant. However, an overabundance of tag is not particularly desirable, for this will merely increase the amount of decay time required to sufficiently remove the activation products, after their detection, so as to prevent interference with subsequent tag releases.

Utilizing the $^{197}$Au/$^{121}$Sb tagging mixture with the present invention, each fuel element in a subassembly is tagged with the same mixture of $^{197}$Au/$^{121}$Sb. The weight ratios of the $^{197}$Au and $^{121}$Sb are varied to produce multiple tags for the various subassemblies. When present within the core of the reactor, these tag mixtures are activated within the fuel elements to produce $^{198}$Au and $^{122}$Sb. Because of the varying weight ratios, each activated tag mixture has a distinctive activity ratio which is directly related to the parent isotope weight ratio. When a cladding defect occurs, the active isotopes are discharged to the primary coolant, and after appropriate sampling and separation procedures, the $^{198}$Au/$^{122}$Sb activity ratio is determined by gamma-ray spectrometry. This ratio is then used to identify the subassembly containing the faulty fuel element.

While the particular $^{197}$Au/$^{121}$Sb weight ratios utilized to tag the fuel elements may be selected anywhere from 0/100 to 100/0 so long as they can be readily differentiated from one another, it is preferred that the first mixture ratio be about 1.00, or a 50—50 mixture, and that subsequent ratios be both increased and decreased by about 5 to 6% until ratios of about 0.50 and 2.00 are obtained. For example, the first ratio might be 1.00, the second 1.05, the third 0.95 and so on until about 0.50 and 2.00. At this point, the difference between mixture ratios should gradually increase in order to insure of easy discrimination between the various isotope ratios until the preferred minimum and maximum ratios of 0.10 and 10.00 are achieved.

One distinct advantage which arises from using the $^{197}$Au/$^{121}$Sb isotope mixture as a tag is the similarity in the half-lives of their activation products. This means that during irradiation within the core of the reactor, the ratio of $^{198}$Au to $^{122}$Sb activities produced are nearly constant. For example, if the saturation activity ratio is 1.00, the activity ratio within the fuel elements after one hour of irradiation is 0.961, and, thereafter, it approaches 1.00. The constancy of the activity ratio permits numerous tags to be manufactured from these two isotopes, for the spacing between the various isotope mixture ratios can be quite small. The exact number of tags that can be put into use depends on the constancy of the ratio of the capture cross sections of $^{197}$Au and $^{121}$Sb as a function of neutron energy and on the precision of the radiochemical separations used to isolate the active isotopes from the sodium coolant, these separation techniques being routine in the art. It is estimated that as many as 100 tags can be made.

It should be noted that about five half-life periods are required to remove a sufficient amount of the activation products so as to avoid interference with tag releases from subsequent failures. While this may appear to be a rather long period of time, most fuel element failures occur very soon after the fuel element subassembly has been placed into the reactor and the reactor put into operation. By spacing the replacement of subassemblies at appropriate time intervals, the required five half-lives will have passed before a new subassembly is inserted into the reactor and thereby significantly increasing the chances of a fuel element failure occurring.

Use of the $^{197}$Au/$^{198}$Pt isotope mixture in the present invention operates on the same general principles as the above-described use of the $^{197}$Au/$^{121}$Sb isotopes. However, tag identification is made on the basis of the $^{198}$Au/$^{199}$Au activity ratio. This is the attractive feature in using the $^{197}$Au/$^{198}$Pt isotope mixture as tags, for tag identification is made on the basis of the ratio of two isotopes of the same element in the sodium coolant. Therefore, a minor instability of gold in the reactor system produces no alteration in the $^{198}$Au/$^{199}$Au ratio of a released tag.

One disadvantage to using the $^{197}$Au and $^{198}$Pt isotopes, however, is that during variations in reactor operating conditions, the $^{198}$Au/$^{199}$Au activity ratio is not as constant as the $^{198}$Au/$^{122}$Sb ratio. The reasons for the greater variation in the $^{198}$Au/$^{199}$Au activity ratio are that the half-life of $^{122}$Sb (2.8 days) is more nearly equal to the half-life of $^{198}$Au (2.7 days) than is the half-life of $^{199}$Au (3.15 days), and that the formation of $^{199}$Au is delayed by the 31 minute half-life of the intermediate activation product $^{199}$Pt as seen in Equation 1.

(1)
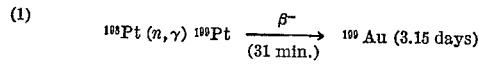

However, the $^{198}$Au/$^{199}$Au activity ratio is sufficiently constant so as to enable the making of a considerable number of distinct and identifiable tags, and the fact that both activation products are isotopes of gold is a sufficiently significant advantage that a half-life difference somewhat greater than desired can be tolerated.

While $^{121}$Sb/$^{198}$Pt isotope mixtures can also be utilized as tags in the present invention, such mixtures are not preferred over either $^{197}$Au/$^{121}$Sb or $^{197}$Au/$^{198}$Pt isotope mixtures. The half-life of $^{198}$Au is between that of $^{122}$Sb and $^{199}$Au, thereby making $^{197}$Au preferable for use with either $^{121}$Sb or $^{198}$Pt. However, the difference in half-life between $^{122}$Sb and $^{199}$Au is even greater than the above-discussed difference between $^{198}$Au and $^{199}$Au. Therefore, the activity ratio of $^{122}$Sb/$^{199}$Au will be even less constant than that of $^{198}$Au/$^{199}$Au, and the advantage of both activation products being isotopes of the same metal is not present with the $^{121}$Sb/$^{198}$Pt isotope mixture.

It should additionally be noted that at times there is only one particular subassembly which is critical or of particular interest at EBR–II, and therefore it is desirable to know whether any fuel elements of that particular subassembly are leaking. Since there is only one subassembly of interest in such a situation, a wide variety of distinct tags is not required. Therefore, the fuel elements of such a subassembly can be tagged with merely one of the three disclosed isotopes, a mixture of two of the isotopes not being required. The detection of the one activation product indicates a leaking fuel element in the subassembly of interest.

It will be understood that the invention is not to be limited to the details given herein but that it may be modified within the scope of the appended claims.

The embodiments of the invention in which an exclusive property or privilege is claimed are defined as follows:

1. A method for detecting and locating failed fuel elements in a liquid-sodium-cooled nuclear reactor wherein said fuel elements contain a sodium bond comprising dissolving a mixture of two stable isotopes selected from the group consisting of $^{197}$Au, $^{121}$Sb and $^{198}$Pt, in the sodium bonding of each of a plurality of said fuel elements prior to the irradiation thereof, hermetically sealing said fuel elements with said isotope mixtures contained therein, operating the reactor with said fuel elements therein, and measuring the activity ratio of the activation products of said selected isotopes present in the sodium coolant of said reactor, the presence of said activation products in the coolant indicating that a fuel element has failed and the activity ratio thereof indicating which fuel element has failed.

2. The method according to claim 1 wherein said mixture of two stable isotopes comprises a mixture of $^{197}$Au and $^{121}$Sb.

3. The method according to claim 1 wherein said mixture of two stable isotopes comprises a mixture of $^{197}$Au and $^{198}$Pt.

4. The method according to claim 1 wherein said fuel elements are grouped in a plurality of subassemblies, and wherein all of the fuel elements in each individual subassembly contain a substantially identical mixture of said selected stable isotopes, a different mixture of said selected stable isotopes being utilized in the fuel elements of each different subassembly.

5. The method according to claim 4 wherein the different mixtures of said selected stable isotopes are prepared by varying the weight ratio of said selected stable isotopes.

6. The method according to claim 5 wherein said weight ratio ranges from about 0.10 to about 10.00.

7. A method for detecting and locating failed fuel elements in a liquid-sodium-cooled nuclear reactor wherein said fuel elements contain a sodium bond and are grouped in a plurality of subassemblies comprsing dissolving a predetermined mixture of two stable isotopes selected from the group consisting of $^{197}$Au, $^{121}$Sb and $^{198}$Pt, in the sodium bonding of each of a plurality of said fuel elements prior to irradiation thereof, all of the fuel elements within each individual subassembly containing a substantially identical mixture of said selected stable isotopes with a different mixture of said selected stable isotopes being utilized in the fuel elements of each different subassembly, hermetically sealing said fuel elements with said predetermined isotope mixtures contained therein, operating the reactor with said fuel elements therein, and measuring the activity ratio of the activation products of said selected isotopes present in the sodium coolant of said reactor, the presence of said activation products in the coolant indicating that a fuel element has failed and the activity ratio thereof indicating which subassembly contains the failed fuel element.

8. The method according to claim 7 wherein said mixture of two stable isotopes comprises a mixture of $^{197}$Au and $^{121}$Sb.

9. The method according to claim 7 wherein said mixture of two stable isotopes comprises a mixture of $^{197}$Au and $^{198}$Pt.

References Cited
UNITED STATES PATENTS
3,663,363   5/1972   Crouthamel et al. __ 176—19 LD REUBEN EPSTEIN, Primary Examiner